United States Patent [19]

Carow et al.

[11] Patent Number: 5,209,262
[45] Date of Patent: May 11, 1993

[54] BREAKAWAY HOSE COUPLING WITH INTEGRATED SWIVEL MECHANISM

[76] Inventors: Walter M. Carow, Rte. 2, Box 379C, Kingston, Tenn. 37763; Alton Richards, Rte. 3, Box 45, Rockwood, Tenn. 37854; Jerry L. Cox, 552 S. Kingston Ave., Rockwood, Tenn. 37854

[21] Appl. No.: 767,427

[22] Filed: Sep. 30, 1991

Related U.S. Application Data

[63] Continuation-in-part of Ser. No. 642,857, Jan. 15, 1991.

[51] Int. Cl.⁵ .............................................. F16L 37/28
[52] U.S. Cl. .................... 137/614.04; 137/68.1; 285/276; 285/133.1
[58] Field of Search ............... 137/614.04, 614, 68.1; 285/276, 281, 181, 317, 318, 133.1

[56] References Cited

U.S. PATENT DOCUMENTS

| | | | |
|---|---|---|---|
| 2,397,265 | 3/1946 | Jacobsson et al. | 284/17 |
| 3,097,867 | 7/1963 | Saloum | 285/86 |
| 3,211,178 | 10/1965 | Kiszko | 137/614.04 |
| 3,435,848 | 4/1969 | Johnston | 137/614.04 |
| 4,402,533 | 9/1983 | Ortloff | 285/18 |
| 4,691,941 | 9/1987 | Rabushka et al. | 285/1 |
| 4,763,683 | 8/1988 | Carmack | 137/614.01 X |
| 4,779,638 | 10/1988 | Nitzberg et al. | 137/68.1 |
| 4,791,961 | 12/1988 | Nitzberg et al. | 137/614.04 |
| 4,800,913 | 1/1989 | Nitzberg et al. | 137/68.1 |
| 4,827,960 | 5/1989 | Nitzberg et al. | 137/68.1 |
| 4,827,961 | 5/1989 | Nitzberg et al. | 137/68.1 |
| 4,905,733 | 3/1990 | Carow | 137/614.04 |
| 5,018,546 | 5/1991 | Carmack et al. | 137/68.1 |

FOREIGN PATENT DOCUMENTS

491000 4/1978 U.S.S.R.
1088640 10/1967 United Kingdom.

Primary Examiner—Martin P. Schwadron
Assistant Examiner—Kevin L. Lee
Attorney, Agent, or Firm—Pitts and Brittian

[57] ABSTRACT

A breakaway hose coupling with an integrated swivel mechanism for releasably joining two fluid dispensing devices, and for selectively disengaging such dispensing devices in response to a disengaging force in excess of a preselected value being exerted on said coupling device. The coupling (10) comprises a first valve assembly (12) for being secured on a first dispensing device and for selectively terminating the flow of fluid from such dispensing device when the coupling (10) is uncoupled. The coupling (10) further comprises a second valve assembly (14) with an integrated swivel mechanism (80) for being secured on a second dispensing device and for selectively terminating the flow of fuel from the second dispensing device when the coupling (10) is uncoupled. Further, vapor conduits (114, 116 and 118) are provided to accommodate the flow of recaptured fuel vapor through the coupling. The coupling (10) also includes automatic disconnect means for maintaining the first and second valve assemblies (12 and 14) in an engaged position in the absence of disengaging force in excess of a preselected value being applied to the coupling, and for disengaging the first and second valve assemblies in response to disengaging force in excess of said preselected value being applied to the coupling, whereupon the first and second valve assemblies (12 and 14) terminate the flow of fluid from their operatively associated dispensing devices.

5 Claims, 7 Drawing Sheets

BREAKAWAY HOSE COUPLING WITH INTEGRATED SWIVEL MECHANISM

This application in part discloses and claims subject matter disclosed in our earlier filed pending application, Ser. No. 7/642,857 filed on Jan. 15, 1991.

Technical Field

This invention relates to an improved breakaway hose coupling for releasably joining two fluid dispensing devices, such as two fluid communicating hoses or a fluid communicating hose and a dispensing nozzle or pump, and for selectively disengaging such dispensing devices in response to a disengaging force in excess of a preselected value being exerted on the coupling. In this particular invention the coupling includes an integrated swivel mechanism which allows the joined dispensing devices to pivot with respect to one another on two different pre-selected axes while at the same time providing flow through communication of recaptured fuel vapor.

BACKGROUND ART

Filling stations for dispensing gasoline and other fuels have long had a problem with vehicles pulling away from fuel dispensing pumps with the dispensing nozzle still inserted in the vehicle's tank, or with the nozzle or dispensing hose otherwise secured or hung on the vehicle. Such incidents usually result in damage to the dispensing pump and/or breakage of the dispensing hose. It will be appreciated that repairing the resulting damage to the dispensing pump or hose can be very costly. Further, the fuel spillage which can result from such damage can create a dangerous and possibly life threatening condition. Attempts have been made to overcome this problem by installing two hoses joined by a breakaway hose coupling device between the dispensing pump and nozzle, with the coupling device being designed to disengage and seal the hose ends when pressure is exerted on the coupling as in the case where a vehicle pulls away from the pump with the nozzle or hose still attached. Certain devices of this type are disclosed in U.S. Pat. Nos. 4,905,733; 4,691,941; 4,402,533; 3,435,848; 3,211,178; 3,097,867; and 2,397,265. Such devices are also disclosed in U.S.S.R. Patent No. 491000 and British Patent No. 1088640. However, such coupling devices are generally rigid structures which inhibit the mobility of the dispensing nozzle.

Also, heretofore, swivel couplings have been placed between dispensing hoses, or between the hose and the dispensing pump or nozzle to increase the mobility of the dispensing nozzle. Such swivel couplings allow the dispensing nozzle to pivot on an axis perpendicular or inclined with respect to the axis of the hose to which it is secured. However, this requires the installation of a separate device between the dispensing pump and dispensing nozzle. Attempts have been made to incorporate a swivel mechanism into a breakaway hose coupling, but the swivel mechanism tends to disrupt the proper operation of the breakaway mechanisms often causing the coupling either to fail to disconnect or to fail to properly seal the hose ends or dispensing device. Examples of attempts to incorporate a swivel mechanism into a breakaway coupling are disclosed in U.S. Pat. Nos. 4,800,913; 4,791,961; 4,779,638; 4,827,960; and 4,827,961.

Therefore, it is an object of the present invention to provide a breakaway hose coupling for joining two fuel dispensing devices which incorporates a swivel mechanism, and which provides for flow through communication of recaptured fuel vapor.

It is another object of the present invention to provide a breakaway hose coupling which disengages and terminates the flow of fluid from such dispensing devices in response to a disengaging force in excess of a preselected value being exerted on the coupling device, and which has an integrated swivel mechanism which does not disrupt the disengaging of the coupling device or the proper termination of the fluid flow from the dispensing devices.

Yet another object of the present invention is to provide a breakaway hose coupling with an integrated swivel mechanism which is light, compact and inexpensive to manufacture and maintain.

DISCLOSURE OF THE INVENTION

Other objects and advantages will be accomplished by the present invention which provides a breakaway hose coupling device with an integrated swivel mechanism. The coupling device is designed for releasably joining two fuel dispensing devices, e.g. joining two fuel dispensing hoses, or joining a dispensing hose to a dispensing pump or nozzle, and for selectively disengaging such dispensing devices in response to a disengaging force in excess of a preselected value being exerted on the coupling device.

The coupling device comprises a first valve assembly for being secured on a first dispensing device and for selectively terminating the flow of fuel from such dispensing device. The first valve assembly includes a first valve housing provided with a first fuel passageway therethrough, the passageway defining a first port for being placed in fluid communication with the first dispensing device. The first valve housing also is provided with at least one vapor conduit therethrough to facilitate flow-through communication of recaptured fuel vapor. The first valve assembly further includes a first valve means mounted within the first valve housing for selectively terminating the flow of fuel through the first passageway.

The breakaway coupling further comprises a second valve assembly with an integrated swivel mechanism for being secured on a second dispensing device and for selectively terminating the flow of fuel from the second dispensing device. The second valve assembly includes a second valve housing for releasably engaging the first valve housing, the second valve housing being provided with a second passageway therethrough defining a first port for being placed in fluid communication with a second port defined by the first passageway of the first valve housing. The second valve assembly also includes an elbow for pivotally engaging the second valve housing and for engaging the second dispensing device. The elbow is provided with a third passageway therethrough defining a first port for communicating with a second port defined by the second passageway of the second valve housing and defining a second port for being placed in fluid communication with the second dispensing device. Also, the second valve housing and the elbow are each provided with at least one vapor conduit therethrough to facilitate flow-through communication of recaptured fuel vapor through the coupling.

A swivel connecting means is provided for pivotally securing the elbow to the second valve housing, whereby the elbow pivots with respect to the second valve housing about a second rotational axis inclined with respect to the axial alignment of the valve means of the first valve assembly. The second valve assembly further includes a second valve means disposed in the second valve housing at a location remote from the swivel connecting means for selectively terminating the flow of fuel through the second passageway.

The breakaway coupling also includes automatic disconnect means for maintaining the first and second valve housings in an engaged position in absence of disengaging force in excess of a preselected value, and for disengaging the first and second valve housings in response to disengaging force in excess of said preselected value, whereby the first and second valve means terminate the flow of fuel through the first and second passageways, respectively upon the disengaging of the first and second valve housings. Also, means are provided for prohibiting the rotation of the first valve housing with respect to the second valve housing.

BRIEF DESCRIPTION OF THE DRAWINGS

The above-mentioned features of the present invention will become more clearly understood from the following detailed description of the invention read together with the drawings in which.

BEST MODE FOR CARRYING TO THE INVENTION

Figures 1, 2:
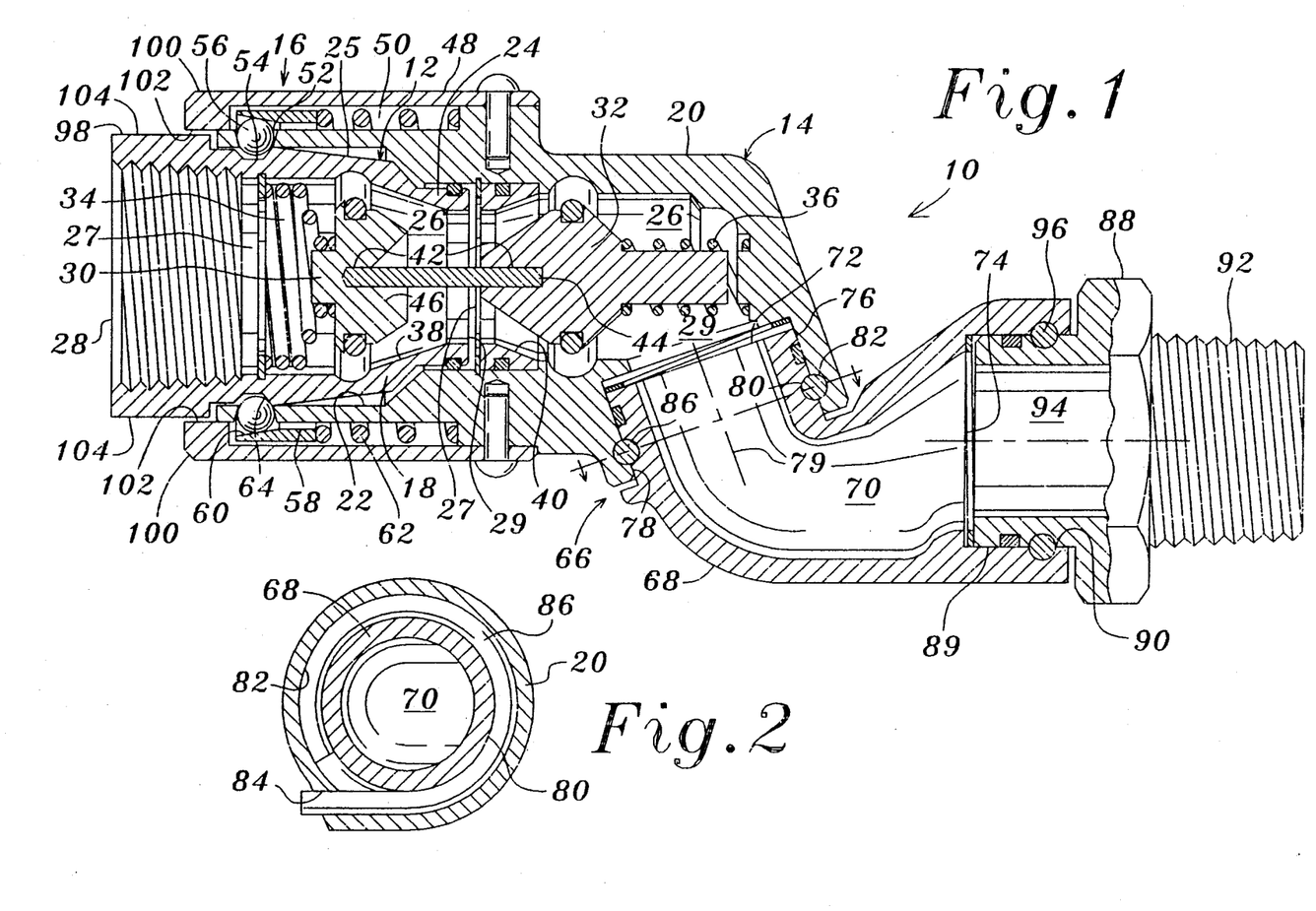
FIG. 1 illustrates a side elevation view, in section, of a breakaway coupling of the present invention.
FIG. 2 illustrates a partial top view, in section, of a breakaway coupling of the present invention.

A breakaway hose coupling incorporating various features of the present invention is illustrated generally at 10 in FIG. 1. The coupling 10 is designed to accomplish the fluid-tight coupling of two fluid dispensing devices, such as two fluid communicating hoses, or a fluid communicating hose and a fluid dispensing pump or nozzle. The coupling is designed to breakaway or disengage upon separation force in excess of a preselected value being applied against the coupling and to terminate the flow of fluid from the dispensing devices to which the coupling is engaged. Whereas, the device 10 will be discussed at times herein in terms of joining two fuel dispensing hoses, or joining a fuel dispensing hose to a fuel dispensing pump or nozzle, it will be appreciated that the device can be used in conjunction with various types of liquid dispensing devices carrying various types of fluids.

The breakaway hose coupling 10 generally comprises first and second valve assemblies 12 and 14, respectively, and disconnect means 16 for releasably joining the valve assemblies 12 and 14 in the absence of axial disengaging force in excess of a preselected value and for releasing at least one of the valve assemblies 12 or 14 in response to axial disengaging force in excess of a preselected value. As is best illustrated in FIG. 1, the first and second valve assemblies 12 and 14 comprise first and second valve housings 18 and 20, respectively, with the valve housing 20 defining a forwardly disposed receptor 22 for slidably receiving the forward portion 24 of the valve housing 18. Each of the valve housings 18 and 20 is provided with a passageway 26 therethrough, with each passageway 26 defining a first port 27 and a second port 29 accessing the passageway. The passageways 26 are disposed with respect to the operatively associated valve housing such that, as the forward end portion of the housing 18 is received in the receptor 22, the passageways 26 of the housings 18 and 20 are aligned to establish fluid communication between the housings. Further, the rearward portion of the housing 18 is provided with releasable connecting means, such as the threaded receptor 28, for releasably engaging a hose end or directly engaging a nozzle, pump, or other dispensing device so as to place such device in fluid communication with the first port 27 of the passageway 26.

In order to automatically seal the passageways 26 when the valve housings 18 and 20 disconnect, each of the valve assemblies is provided with a valve means disposed within the operatively associated passageway 26. In the preferred embodiment, such valve means includes the poppet valves 30 and 32 which are axially mounted in the passageways 26 of the housings 18 and 20, respectively. Also provided are the spring members 34 and 36 which serve both as a means for mounting the poppet valves and as a means for biasing the poppet valves 30 and 32 toward the valve seats 38 and 40, respectively, defined by the walls of the passageways 26.

Each of the poppet valves 30 and 32 is provided with a forwardly disposed pin receptor 42 which is releasably receptive of an opposite end portion of the alignment pin 44. As illustrated in FIG. 1, when the valve housings 18 and 20 are in an engaged position the alignment pin 44 serves to hold the poppet valves in an axially aligned, open position against the bias of the springs 34 and 36. However, when the housings 18 and 20 disengage and separate the pin 44 slides from the receptor 42 of the poppet valve 30 allowing the poppet valves 30 and 32 to seat against the valve seats 38 and 40, respectively. Resultantly, the passageways 26 are sealed and the flow of fluid from the dispensing devices to which the valve housings are secured is terminated.

With respect to the alignment pin 44, it will be understood that the pin can be secured to, or integral with, one of the poppet valves 30 or 32 if desired. Further, one or both of the pin receptors 42 can be provided with a conical mouth 46 to facilitate the insertion of the pin 44 in the receptor 42 when the forward portion 24 of the housing 18 is being inserted into the receptor 22 of the housing 20.

As indicated above, the disconnect means 16 serves as a means for automatically disconnecting the housings 18 and 20 when axial disengaging force in excess of a preselected value is applied to the coupling 10. In the preferred embodiment the disconnect means 16 includes an annular disconnect housing defined by the exterior of the housing 20 and an outer sleeve 48 such that the disconnect housing defines a latch cavity 50 circumscribing the housing 20. A ball latch mechanism is housed within the latch cavity 50 which serve to releasably lock the housing 18 in the receptor 22. In this regard, a plurality of latch ball openings 52 are provided in the housing 20 which register with an annular recess 54 provided in the housing 18 as the housing 18 is received in the receptor 22. Each of the latch ball openings is receptive of a latch ball 56. As illustrated in FIG. 1, when the latch mechanism is in a locked position the latch balls 56 protrude into the receptor 22 and releasably seat in the annular recess 54, and, thus, prohibit the housing 18 from disengaging from the receptor 22.

The ball latch mechanism also includes a locking means for locking the latch balls 56 in the recess 54. In the preferred embodiment such means includes an axially movable tapered ring 58 housed within the cavity 50, the ring 58 defining a camming surface 60 for engaging the balls 56 and forcing them into the openings 52 and the recess 54. In this regard, the tapered ring 58 is biased toward the latch balls 56 by a spring member 62 to provide the necessary load to the balls 56, forcing them into the recess 54 with a magnitude defined by the geometry and biasing force of the spring member. However, the application of disengaging force, or pull, on the valve housings 18 and 20 causes a resolution of the axial disengaging force to the balls 56 via the sloping sidewall 64 of the recess 54. The load transmitted to the balls is transmitted to the tapered ring 58 and, in turn, to the spring member 62 which yields proportional to the loading. As the spring member 62 yields, it permits the tapered ring 58 to move axially, providing increased radial freedom for the balls 56 which ride up the sloping sidewall 64 until they no longer extend into the recess 54. Thus, the balls 56 no longer serve to retain the housing 18 within the receptor 22, thereby allowing the housing 18 to disengage from the housing 20. Of course, as discussed above, as the valve housing 18 disengages and the housings 18 and 20 separate, the poppet valves 30 and 32 serve to seal their respective passageways 26.

It will be recognized by those skilled in the art that the axial disengaging force necessary to disengage the housing 18 from the receptor 22 can be preselected through the use of a spring member 62 which provides a preselected biasing force (and through pre-selection of the angle of the sloping sidewall 64). Thus, when the device 10 is used to connect fuel supply hoses associated with a fuel dispensing pump, a spring member 62 can be selected which maintains the engaged position of the valve housings during normal operation, but allows disengagement when disengaging force sufficient to damage the supply pump is exerted on the coupling. It will also be noted that in the preferred embodiment, forward portion 24 of the housing 18 is provided with a sidewall 25 defining a shallow taper. The tapered sidewall 25 serves as a camming surface for forcing the balls 56 into the cavity 50 as the housing 18 is inserted into the receptor 22, thereby decreasing the engaging force necessary to accomplish the coupling of the housings 18 and 20.

The swivel mechanism of the coupling 10 is illustrated generally at 66 in FIG. 1. The mechanism 66 includes a swivel housing or elbow 68 having a passageway 70 therethrough defining a first port 72 for communicating with the passageway 26 of the housing 20 and a second port 74 for being placed in fluid communication with a dispensing device. More specifically, the elbow 68 has a first end portion 76 which is rotatably received in an annular receptor 78 provided in the valve housing 20, thereby placing the passageways 26 and 70 in fluid communication. It will be noted that the first end portion 76 of the elbow and receptor 78 are aligned on a axis which is at a preselected angle relative to the primary axis on which the receptor 22 of the housing 20, and the poppet valves 30 and 32, are oriented. Accordingly, when the first end portion 76 of the elbow is rotated in the receptor 78 the elbow 68 swivels about a secondary axis 79 inclined with respect to such primary axis.

Figure 1A:
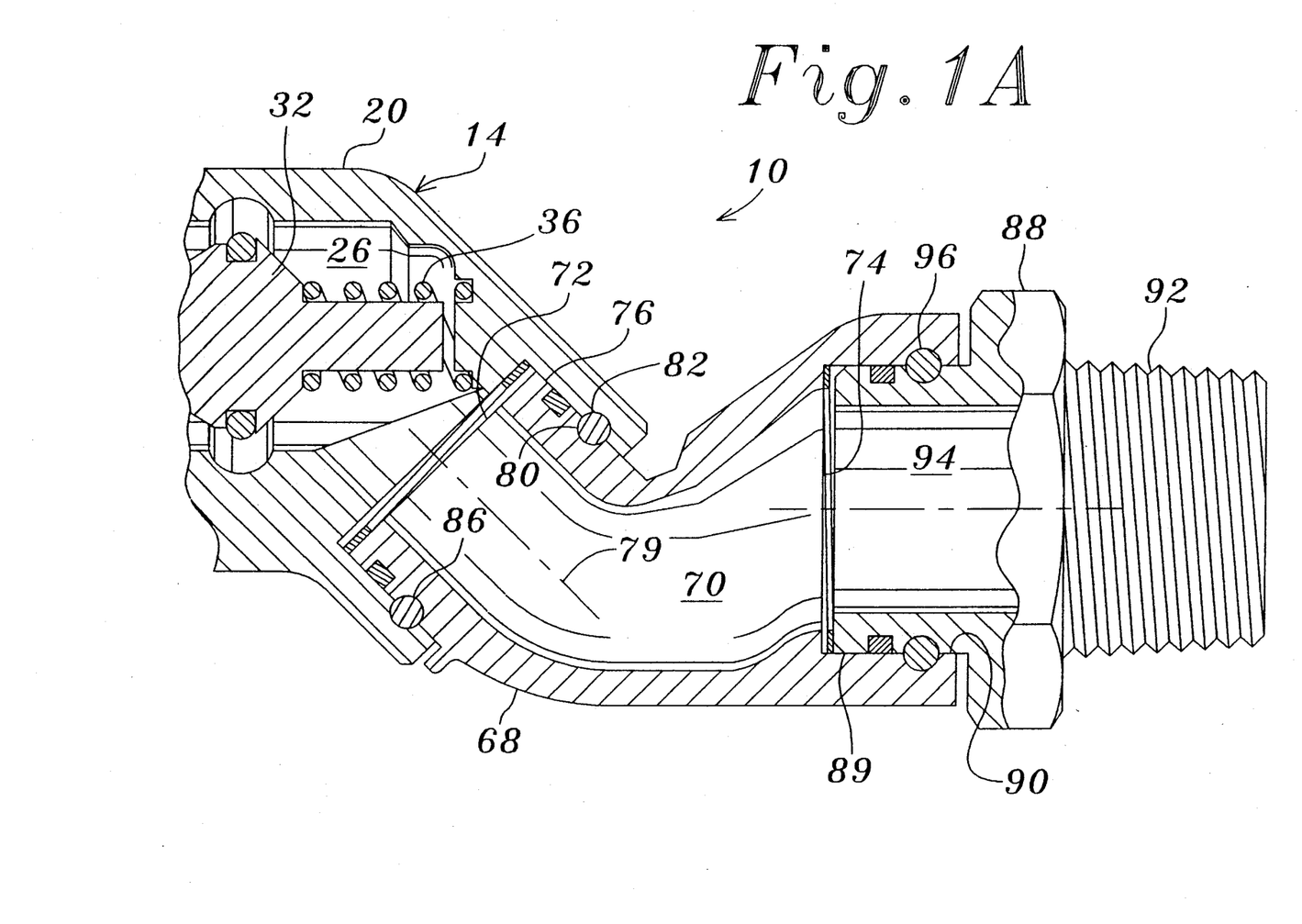
FIG. 1A illustrates a partial side elevation view, in section, of an alternate embodiment of the breakaway coupling of the present invention.

In the illustrated embodiment of FIG. 1, this secondary axis 79 is aligned at approximately a seventy degree angle to the primary axis, but this angle may vary. For example, in FIG. 1A the secondary axis 79 is orientated at approximately a 45 degree angle to the primary axis. This decrease in the relative angle of the secondary axis 79 allows 360 degrees rotation of the elbow 68 with respect to the housing 20 without having to lengthen the first end portion 76 of the elbow 68 to provide clearance between the elbow 68 and housing 20.

The swivel mechanism 66 also includes means for rotatably locking the first end portion 76 of the elbow in the receptor 78. In the preferred embodiment, the first end portion 76 and the receptor 78 are provided with the registering annular grooves 80 and 82, respectively, which cooperatively define an annular channel circumscribing the first end portion 76. Further, as best illustrated in FIG. 2, the housing 18 defines a further channel 84. Into the channel 84 and the channel formed by the grooves 80 and 82 is inserted a flexible rod 86 having a substantially circular cross-section. Preferably the rod 86 is fabricated of nylon or other strong, durable resilient material. Thus, as will be recognized by those skilled in the art, when seated in the grooves 80 and 82 the rod 86 prohibits the first end portion 76 from being removed from the receptor 78, and also serves as a bearing to facilitate the rotational engagement of the elbow 68 and valve housing 20. Of course, the above described locking means represents only one suitable means for rotatably locking the first end portion 76 in the receptor 78, and other suitable means can be used if desired. The swivel mechanism 66 also includes means for rotatably connecting the elbow 68 to a hose, nozzle, pump, or other dispensing device, such that the passageway 70 is in fluid communication with such device. In the preferred illustrated embodiment such means includes a connecting member 88 having a first end portion 89 for being rotatably received in a receptor 90 defined in the elbow 68 and having a threaded portion 92 for releasable engaging a dispensing device. Further, a passageway 94 is provided through the connecting member 88 to establish fluid communication between the elbow and dispensing device. In this preferred embodiment the connecting member 88 is locked into the receptor 90 with a flexible rod 96 as described above with respect to the locking of the first end portion 76 of the elbow in the receptor 78. Thus, axial rotation of the coupling 10 with respect to the dispensing device is accommodated, with the associated rotational axis being inclined with respect to the secondary axis 79 about which the first end portion 76 of the elbow 68 rotates.

It should be noted that the connecting member 88 can be integral with the dispensing device if desired or comprise a separate component which is mounted on the inlet port of a conventional nozzle, hose, or other dispensing device.

The device 10 is also is provided with means for prohibiting rotation of the housing 18 with respect to the valve housing 20. In this regard, given the rotational engagement of the elbow 68 with the valve housing 20 and the rotational engagement of the connecting member 88 with the elbow 68, it is not necessary to provide for rotation of the housing 18 with respect to the housing 20. Moreover, such rotation can undermine the seal between the housing 18 and the walls of the receptor 22 and otherwise disrupt the functioning of the disconnect means 16.

Figures 3, 4:
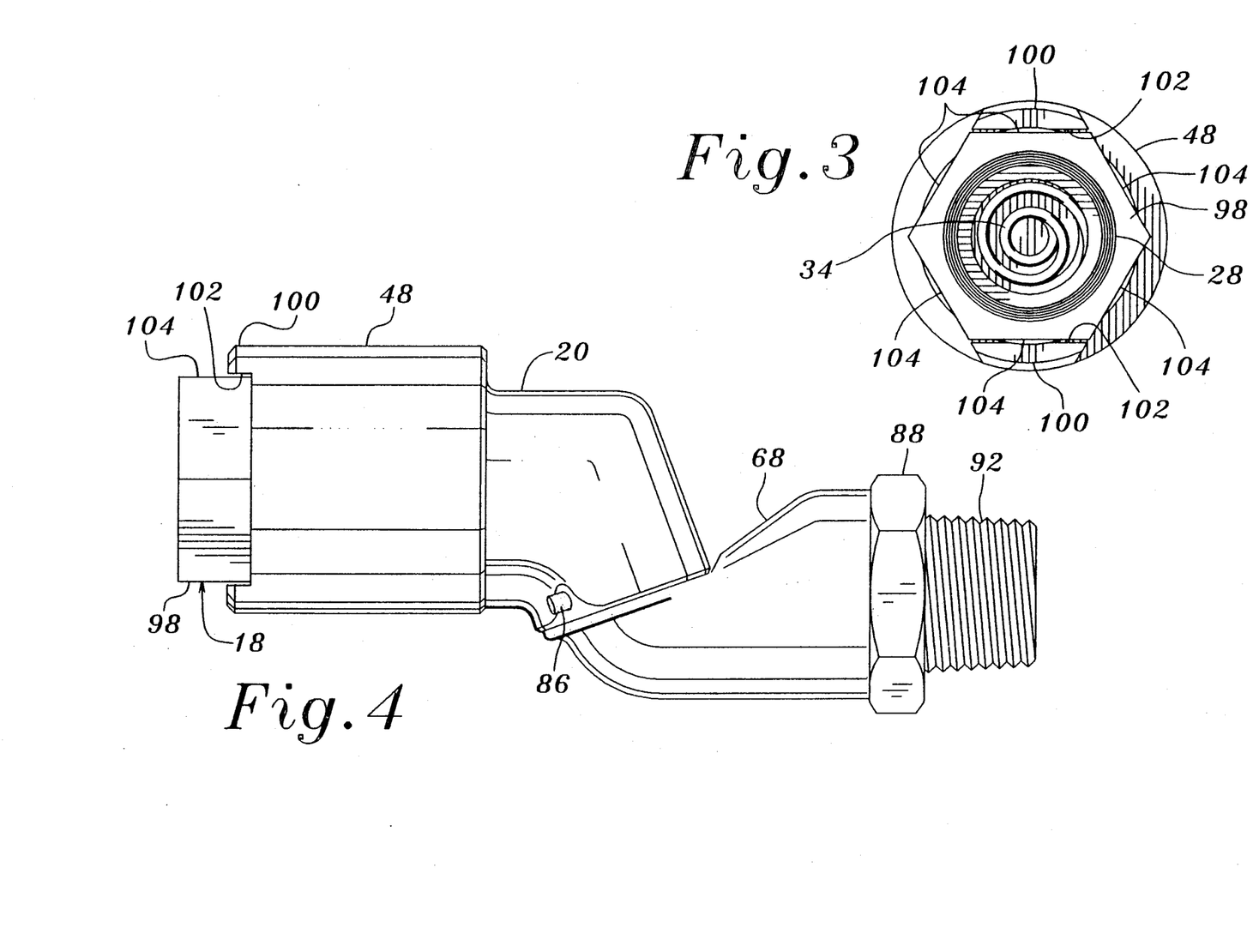
FIG. 3 illustrates a partial end view of a breakaway coupling of the present invention.
FIG. 4 illustrates a side elevation view of a breakaway coupling of the present invention.
Figure 5:
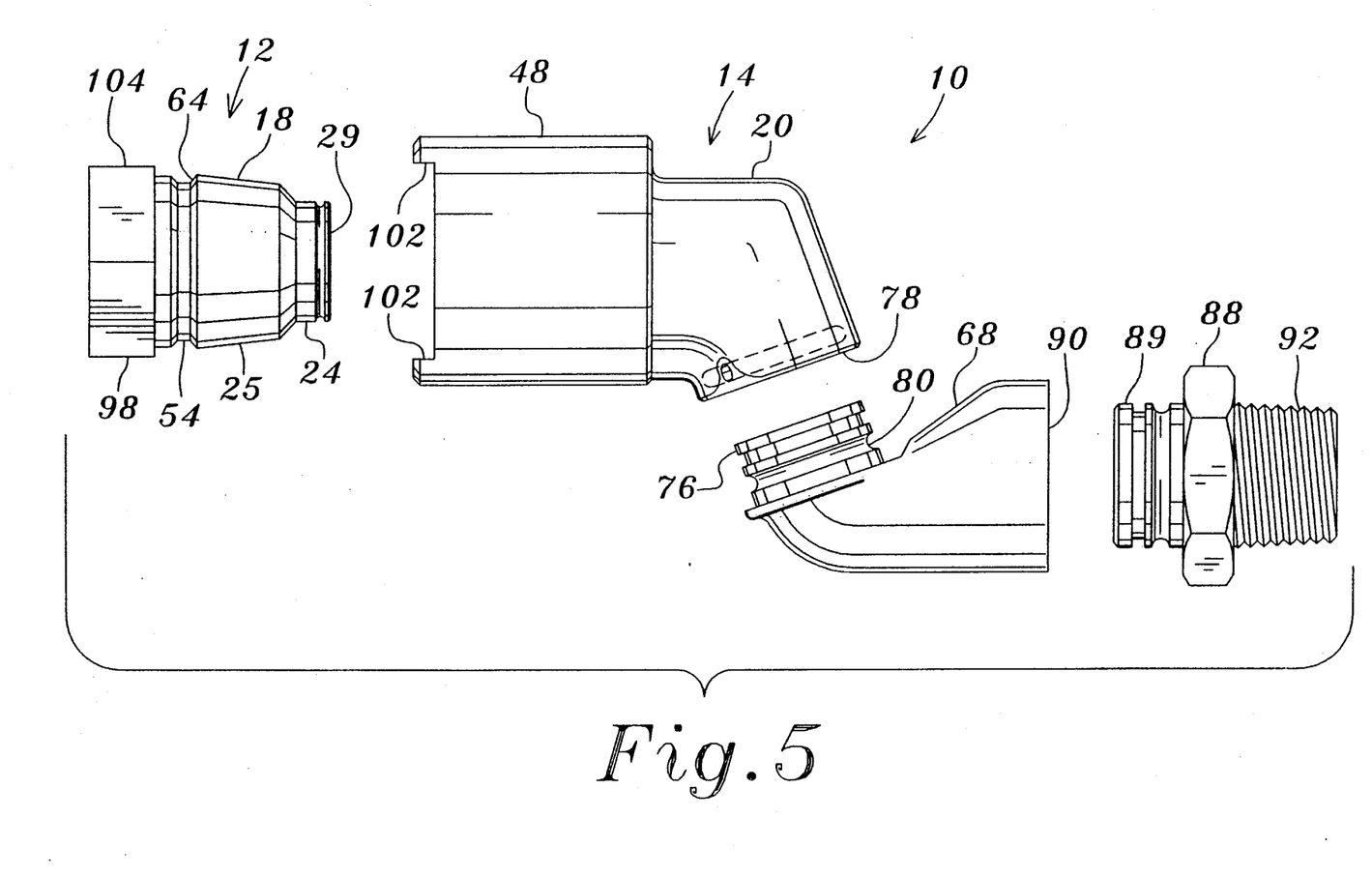
FIG. 5 illustrates an exploded side elevation view of a breakaway coupling of the present invention.

Of course, it will be appreciated that various means can be used to prohibit rotation of the housing 18 with respect to the housing 20. However, in the preferred illustrated embodiment the housing 18 defines a rearward end portion 98 defining a hexagonal configuration for being received by a wrench in order to facilitate the mounting of the housing 18 on a hose or other dispensing device. (See FIGS. 3, 4 and 5). Further, the outer sleeve 48 is provided with at least one protruding member 100, there being two such protruding members provided in the illustrated embodiment. Each protruding portion 100 has an engaging surface 102 which is disposed so as to engage or be proximate one or more of the flat surfaces 104 of the rearward end portion 98 as the housing 18 is positioned in the receptor 22. Accordingly, upon any rotational force being applied to the housing 18 the flat surfaces 104 will encounter the protruding members 100 and rotation will be prohibited.

Figures 6, 7:
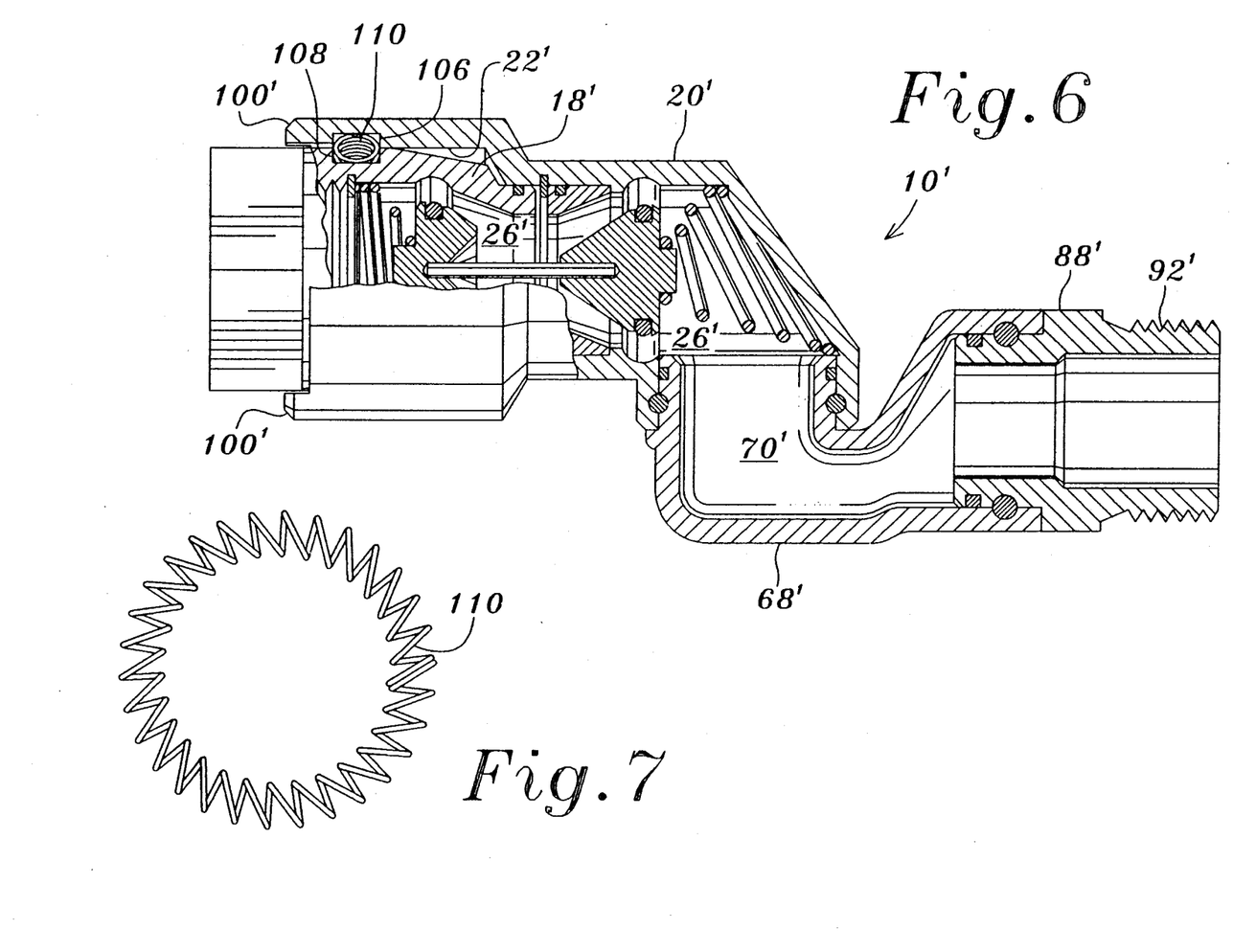
FIG. 6 illustrates a side elevation view, partially in section, of an alternate embodiment of the breakaway coupling of the present invention.
FIG. 7 illustrates a front view of a canted-coil spring of the breakaway coupling of FIG. 6.

In FIG. 6, an alternate embodiment of the coupling of the present invention is illustrated at 10'. Components of the coupling 10' which are common to the coupling 10 described above are referenced by common prime numbers. The coupling 10' is provided with an alternative disconnect means for disconnecting the housings 18' and 20' when disengaging force in excess of a preselected value is applied to the coupling. In this embodiment an annular groove 106 is provided in the receptor 22', and a registering annular groove 108 is provided in the housing 18', so as to circumscribe the housing 18'. A circular canted-coil spring 110 is mounted in the registering grooves 106 and 108, and serves to releasably hold the housing 20' in the receptor 22' during normal operation. (See FIG. 7) However, when disengaging force in excess of a preselected value is applied to the coupling 10' the force applied to the spring 110 by the housings 18' and 20' as they seek to disengage causes the spring 110 to compress into one of the grooves 106 or 108, thus allowing the housings to disconnect. Of course, the force necessary to effect disengagement can be preselected by selecting the appropriate canted-coil spring 110. Further, the disengagement force required can also be manipulated by providing the registering grooves 106 and 108 with sloping or tapered sidewalls as is discussed with respect to the sloping sidewall 64 of the recess 54. (See FIG. 1).

It will be noted that in the illustrated embodiment of FIG. 6 the protruding members 100' are carried by the valve housing 20' since no outer sleeve 48 is utilized. Further, it will be understood that the protruding portions 100' need not be integral with the housing 20' as depicted in FIG. 6, and it is contemplated that the protruding members 100' can be removably mounted on the housing 20' if desired.

Figure 8:
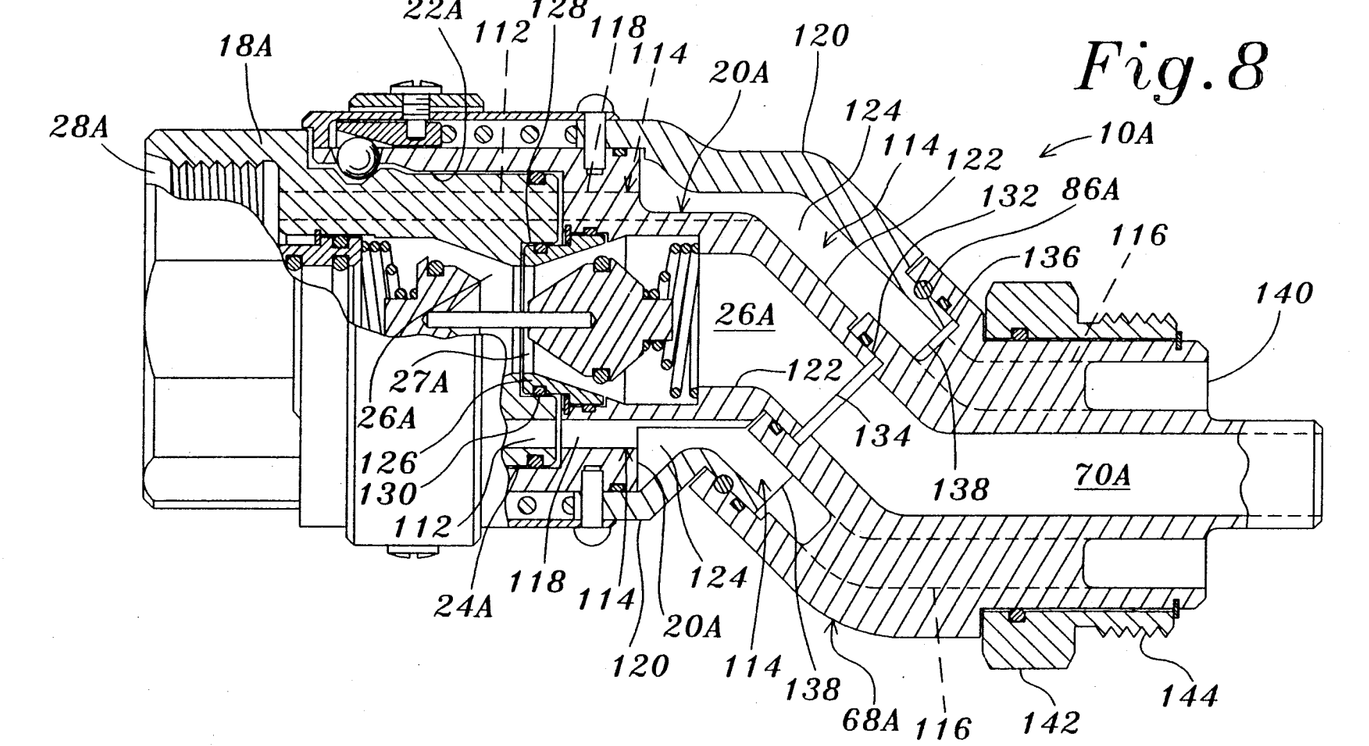
FIG. 8 illustrates a side elevation view, partially in section, of a further alternate embodiment of the breakaway coupling of the present invention.
Figure 9:
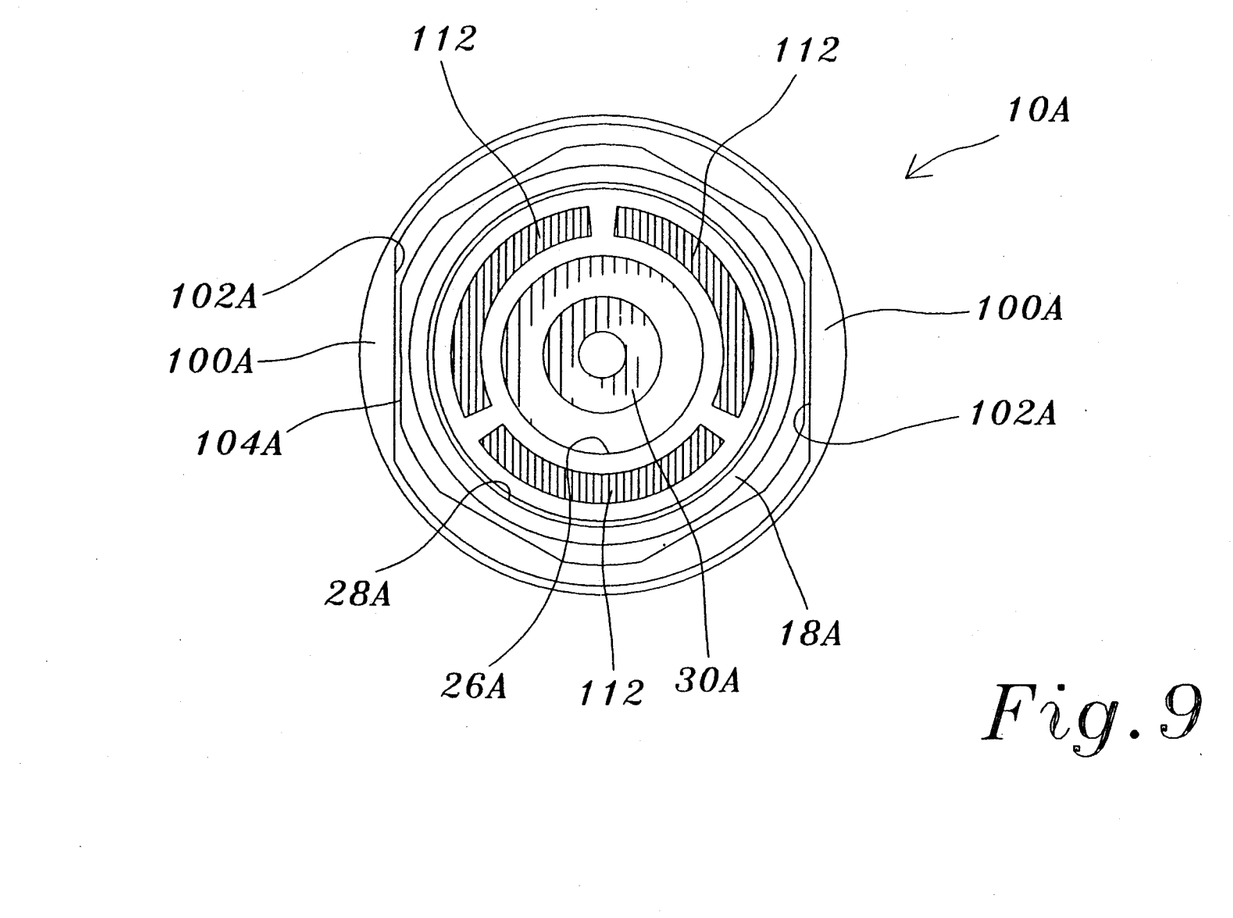
FIG. 9 illustrates a front view of the further alternate embodiment of the breakaway coupling of the present invention illustrated in FIG. 8.

In FIGS. 8 and 9, a further alternate embodiment of the breakaway hose coupling is illustrated at 10A. Components of the coupling 10A which are common to the coupling 10 or 10' described above are referenced by common numbers followed by the alphabetic character "A".

In the alternate embodiment of the breakaway coupling 10A a vapor communicating means is provided for communicating recaptured vapor through the coupling. In this regard, those skilled in the art will appreciate that in certain legal jurisdictions a fuel dispensing hose must incorporate a vapor conduit for recapturing vaporized fuel generated during the dispensing operation. Such hoses generally comprise a hose within a hose with the inner hose serving to carry fuel and the outer hose serving to define a vapor passage. The vapor communicating means of the present invention is provided to accommodate such hoses and other dispensing devices designed to handle recaptured vaporized fuel.

The vapor communicating means of the present invention includes at least one vapor conduit 112 disposed in the valve housing 18A for providing vapor communication therethrough, and at least one vapor conduit 114 disposed in the valve housing 20A for providing vapor communication therethrough and for communicating with the conduit 112. Also, the elbow 68A defines at least one vapor conduit 116 for providing vapor communication therethrough, and for communication with the vapor conduit 114 of the housing 20A. Resultantly, the vapor conduits 112, 114 and 116 provide vapor communication through the coupling 10A, between the hose or other dispensing device to which the housing 18A is secured and the hose or other dispensing device to which the elbow 68A is secured.

More specifically, in the preferred embodiment illustrated in FIGS. 8 and 9, the first valve housing 18A is provided with three vapor conduits 112 which are disposed about the passageway 26A so as to jacket the passageway 26A. Each of the conduits 112 extends between the threaded receptor 28A and the forward surface of the forward portion 24A of the housing 18. The second valve housing 20A is provided with three vapor conduit sections 118 which communicate with the receptor 22A of the housing 20A and which are disposed so as to register with the conduits 112 when the housing 18A is secured in the receptor 22A. The housing 20A is also provided with a rearwardly disposed sleeve 120 which circumscribes the housing walls 122 which define the passageway 26A of the housing 20A so as to define a cavity 124 therebetween. As illustrated, vapor conduit sections 118 communicate with the cavity 124 such that the sections 118 and the cavity 124 define the vapor conduit 114.

In order to insure that the passageways 26A are releasably sealed at the point where the housing 18A and housing 20A engage such that fuel does not escape into the vapor conduits 114 and 116, the first port 27A of the housing 20A is circumscribed with a protruding lip 126 which is received in a coaxial receptor 128 provided in the housing 18A. Of course, a suitable sealing means is provided between the sidewalls of the receptor 128 and the lip 126, such as the illustrated O-ring seal 130.

Further, in the preferred illustrated embodiment, the elbow 68A is provided with three vapor conduits 116 which are disposed about the passageway 70A. Further, the elbow 68A is provided with a inner receptor 132 for rotatably receiving the outboard end portion 134 of the body 20A so as to place the passageway 70A of the elbow 68A in fluid communication with the passageway 26A of the housing 20A. An outer receptor 136 is also provided in the elbow 68A which is coaxial with the inner receptor 132 and which communicates with the vapor conduits 116. This outer receptor 136 rotatably receiving the outboard end portion 138 of the sleeve 120 so as to place the cavity 124 in fluid communication with the vapor conduits 116.

The outboard end portion 140 of the elbow 68A is provided with means for engaging a conventional hose or other dispensing device designed to facilitate the recapture of fuel vapor. In the preferred illustrated embodiment such means includes a rotatably mounted nut 142 circumscribing the end portion 140, the nut 142 having a threaded portion 144 for being threadably received in a conventional threaded female receptor of a hose or other dispensing device. However, it will be recognized that other suitable means can be utilized to secure the elbow 68A to a dispensing device.

In light of the above, is will be appreciated that the present invention provides an improved breakaway hose coupling with great advantages over the prior art. The invention provides a coupling which automatically disengages and seals the hose ends or dispensing device conduit to which it is secured in response to disengaging force in excess of a preselected value, while also incorporating a swivel mechanism which allows rotation on two different rotational axes. Further, the swivel mechanism provides for rotation at a point displaced from the disconnect mechanism and the associated poppet valves such that the functioning of such mechanism is not disrupted.

While a preferred embodiment has been shown and described, it will be understood that there is no intent to limit the invention to such disclosure, but rather it is intended to cover all modifications and alternate constructions falling within the spirit and scope of the invention as defined in the appended claims.

We claim:

1. A breakaway hose coupling device with integrated swivel mechanism for releasably joining two fuel dispensing devices in fluid communication, and for selectively disengaging said dispensing devices in response to a disengaging force in excess of a preselected value being exerted on said coupling device, said coupling device comprising:

a first valve assembly for being secured on, and being placed in flow-through fluid communication with, a first said dispensing device and for selectively terminating flow of fuel from said first dispensing device, said first valve assembly including a first valve housing having a first valve means mounted therein for selectively terminating flow of fuel through said first valve assembly, said first valve means being aligned on a first axis, said first valve housing being provided with
 a) a first passageway therethrough defining a first port for being placed in fluid communication with said first dispensing device, and a second port,
 b) a plurality of first vapor conduits radially disposed about said first passageway for communicating recaptured fuel vapor, each of said first vapor conduits having a first port for being placed in fluid communication with said first dispensing device, and a second port;

a second valve assembly for being secured on, and placed in flow-through fluid communication with, a second said dispensing device and for selectively terminating flow of fuel from said second dispensing device, said second valve assembly including a second valve housing and an elbow, and having swivel connecting means for pivotally securing said elbow with said second valve housing whereby said elbow selectively swivels with respect to said second valve housing on a second axis inclined with respect to said first axis, said second valve assembly also including a second valve means disposed in said second valve housing at a location remote from said swivel connecting means for selectively terminating flow of fuel through said second valve assembly, said second valve housing being provided with
 a) rearwardly protruding housing walls defining a second passageway through said second valve housing, said second passageway defining a first port for being placed in fluid communication with said second port of said first passageway, said protruding housing walls including an outboard end portion defining a second port of said second passageway,
 b) a sleeve circumscribing said protruding housing walls defining a vapor cavity between said protruding housing walls and said sleeve, said vapor cavity having a first end and a second, said sleeve defining an outboard end portion whereby said outboard end portion of said sleeve and said outboard end portion of said protruding housing walls define said second port of said vapor cavity,
 c) a plurality of vapor conduit sections circumscribing said second passageway, each of said vapor conduit sections having a first port for being placed in fluid communication with said second port of one of said first vapor conduits of said first valve housing, and a second port in fluid communication with said first end of said vapor cavity, said elbow provided with
 a) a third passageway therethrough having a first portion in fluid communication with said second port of said second passageway, and a second port for being placed in fluid communication with said second dispensing device,
 b) a plurality of third vapor conduits radially disposed about said third passageway of said elbow, each of said third vapor conduits having a first port in fluid communication with said second end of said vapor cavity, and a second port in fluid communication with said second dispensing device;

means for prohibiting rotation of said first valve housing with respect to said second valve housing; and automatic disconnect means for maintaining said first and second valve housings in an engaged position in absence of said disengaging force in excess of a preselected value, and for disengaging said first and second valve housing in response to said disengaging force in excess of said preselected value, whereby said first and second valve means terminate flow of said fuel through said first and second valve assemblies, respectively, upon disengaging of said first and second valve housings.

2. The breakaway hose coupling device of claim 1 wherein said first valve housing is provided with a first annular connecting means circumscribing said first port of said first passageway and said first port of said first vapor, for releasably engaging said first dispensing device, said first connecting means being axially aligned on said first axis, and wherein said elbow swivels with respect to said second valve housing about a second axis substantially perpendicular to said first preselected axis.

3. The breakaway hose coupling of claim 2 wherein said first annular connecting means includes a threaded receptor provided in said first valve housing.

4. The breakaway hose coupling of claim 1 wherein said elbow includes engaging means circumscribing said first port of said third vapor conduits for rotatably engaging said outboard end portion of said protruding housing walls whereby said third passageway is placed in fluid communication with said second passageway, and wherein said elbow includes further engaging means for rotatably engaging said outboard end portion of said sleeve of said second valve housing, whereby said first ports of said third vapor conduits are placed in fluid communication with said vapor cavity of said second valve housing.

5. The breakaway hose coupling of claim 4 wherein said second valve housing is provided with a protruding lip member circumscribing said first port of said second passageway, and wherein said forward end portion of said first valve housing defines an annular receptor communicating with said second port of said first passageway for sealably receiving said protruding lip member.

* * * * *